United States Patent
Blanche et al.

(10) Patent No.: US 9,726,827 B2
(45) Date of Patent: Aug. 8, 2017

(54) RECONFIGURABLE DIFFRACTIVE OPTICAL SWITCH AND METHOD FOR OPERATING THE SAME

(71) Applicants: Pierre Alexandre Blanche, Tucson, AZ (US); Nasser N. Peyghambarian, Tucson, AZ (US); Brittany Lynn, Tucson, AZ (US)

(72) Inventors: Pierre Alexandre Blanche, Tucson, AZ (US); Nasser N. Peyghambarian, Tucson, AZ (US); Brittany Lynn, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 15/249,792

(22) Filed: Aug. 29, 2016

(65) Prior Publication Data

US 2017/0052324 A1    Feb. 23, 2017

Related U.S. Application Data

(62) Division of application No. 14/439,778, filed as application No. PCT/US2013/067716 on Oct. 31, 2013, now Pat. No. 9,453,970.

(60) Provisional application No. 61/796,053, filed on Nov. 1, 2012.

(51) Int. Cl.
*G02B 6/35* (2006.01)

(52) U.S. Cl.
CPC ......... *G02B 6/3518* (2013.01); *G02B 6/3534* (2013.01); *G02B 6/359* (2013.01); *G02B 6/3556* (2013.01)

(58) Field of Classification Search
CPC ............................. G02B 6/3518; G02B 6/3534
See application file for complete search history.

(56) References Cited

U.S. PATENT DOCUMENTS

| | | |
|---|---|---|
| 5,828,485 A | 10/1998 | Hewlett |
| 6,330,102 B1 | 12/2001 | Daneman et al. |
| 6,816,640 B2 | 11/2004 | Tew |

(Continued)

OTHER PUBLICATIONS

I.G. Manolis, et al. (Jun. 2002), "Reconfigurable Multilevel Phase Holograms for Optical Switches", IEEE Photon. Technol. Lett., vol. 14, No. 6.

(Continued)

*Primary Examiner* — Omar R Rojas
(74) *Attorney, Agent, or Firm* — Yakov S. Sidorin; Quarles & Brady LLP

(57) ABSTRACT

Optical switch based on a micro-minor device such as a DMD configured to simultaneously switch light from N inputs to M outputs with switching times of about 10 microseconds, where N and M are generally greater than one. The minors of the device are oriented according to a pattern calculated based on a Fourier Transform of spatial distribution of M outputs such as to form, in diffraction of light incident on the device, and diffraction light pattern that in the output plane is substantially congruent with the spatial distribution of M outputs. The device can be configured as a modulator of amplitude and/or a modulator of phase of incident light wavefront.

7 Claims, 12 Drawing Sheets

(56) References Cited

U.S. PATENT DOCUMENTS

| | | | |
|---|---|---|---|
| 6,870,985 B2* | 3/2005 | Noonan | G02B 6/3516 385/16 |
| 7,095,494 B2 | 8/2006 | Mehrl et al. | |
| 7,502,160 B2 | 3/2009 | Aksyuk et al. | |
| 7,664,348 B2 | 2/2010 | Ma | |
| 8,139,284 B2* | 3/2012 | Pan | G02B 26/0833 359/291 |
| 2001/0050787 A1* | 12/2001 | Crossland | G02F 1/292 359/15 |
| 2006/0126151 A1 | 6/2006 | Aksyuk et al. | |
| 2007/0002284 A1 | 1/2007 | Imaoka et al. | |

OTHER PUBLICATIONS

L. Yoder et al. (Jul. 2001), "DLP(TM) Technology: Applications in Optical Networking", Texas Instruments white paper, SPIE 4457.

* cited by examiner

RECONFIGURABLE DIFFRACTIVE OPTICAL SWITCH AND METHOD FOR OPERATING THE SAME

CROSS REFERENCE TO RELATED APPLICATIONS

This application is a divisional from pending U.S. patent application Ser. No. 14/439,778 published as U.S. 2015/0293308, which is a national stage of international patent application No. PCT/US2013/067716 published as WO 2014/113118, which in turn claims priority from and benefit of U.S. Provisional Patent Application No. 61/796,053. The disclosure of each the above-identified patent applications is incorporated herein by reference in its entirety.

STATEMENT REGARDING FEDERALLY SPONSORED RESEARCH OR DEVELOPMENT

This invention was made with government support under Grant Number FA9550-10-C-009 awarded by USAF/AFOSR and Grant Number EEC-0812072 awarded by NSF. The government has certain rights in the invention.

TECHNICAL FIELD

The present invention generally relates to optical switching and, in particular, to a reconfigurable optical switch operable to switch optical signals from N inputs to M outputs on the basis of a digital micro-mirror device the individual reflecting elements of which are oriented according to a compilation of states forming, in far field, a diffraction pattern spatially congruous with the configuration of the M outputs.

BACKGROUND

Enduring increase of the flexibility of the telecommunications network is one of industrial needs the satisfaction of which supports the demand of continually-rising levels of telecommunication traffic, with dynamic network optical systems leading the way as a solution that allows a light-path provisioning to distribute bandwidth of the traffic on an as-needed basis. Historically, systems required that a technician be involved to re-provision the optical light-paths of a network system, but more recent implementations are moving toward algorithm-controlled, remote sub-systems and reconfiguration time is becoming a new bottleneck of implementing such sub-systems.

Indeed, time spent reconfiguring an optical switch is time that the circuit is non-transmitting, which places stringent speed requirements on emerging optical switching technologies. The main benefits to using optical switches are that they these switches are protocol and bit-rate independent—the characteristics that alleviate the requirement for frequent upgrades in response to changing network fabrics and increasing data rates. Moreover, as the light-path redirection with the use of an optical switch is often effectuated in free space, a modular design of a system utilizing such switch can be scaled up, leading the way to the implementation of higher port count devices.

Currently existing versions of optical switches are subject to at least three main operational shortcomings, which (as recognized in the related art) limit the applicability of the existing devices. Among these drawbacks are the requirement of manual manipulation of a switch, a single point failure mechanism, and operation at a speed that falls short of meeting sub-millisecond application requirements. Optical switches based on an array of beam-redirecting devices have been discussed by the related art to address the above-identified shortcoming, however no solution offered to-date succeeded in a satisfactory fashion.

Three-dimensional (3D) microelectromechanical system (MEMS) devices, for example, employ two opposing arrays of small gimbaled mirrors to steer light arriving from one input (such as an optical fiber) to one output (such as another optical fiber) in an analog-steering manner. One commercially available system utilizing a 3D MEMS design, for example, specifies a port count of 320×320, typical insertion loss of 2.0 dB, and switching time of 25 ms (see S320 data sheet available at http://www.calient.net/products/s-series-photonic-switch/). The majority of the time required for switching in such 3D-MEMS device is generally consumed by the operation of a feedback loop required for precise angular mirror localization of the MEMS device.

Devices commonly defined and referred to in related art as "digital micro-mirror devices" or DMDs, have operational nature similar to that of MEMS devices, but are accepted as digital (as compared to analog) devices. In comparison with a MEMS device (an individual reflector or mirror of which can assume any orientation allowed by the structure of the corresponding gimbal or hinge), an individual reflector of a DMD device assumes only one of the two stable operational positions. As a result—and notwithstanding the superior switching speed of the DMD device over that of the MEMS device (50 microsecond or less vs. about 1 ms, respectively), lower consumption of electrical power, and longer time-to-failure (due to smaller dimensions and lower weights of individual mirrors)—where a MEMS-based device is operationally capable of implementing a 1-to-N (or 1×N) optical switch, the DMD can only redirect the incident beam of light to two pre-determined positions (1-to-2, or 1×2 optical switch). This structurally-limited operational restriction dramatically complicates a DMD-based architecture that has to be realized to implement an even 1×N switch with the use of currently-available DMDs. Indeed, instead of having the DMD reflectors/mirrors on one single platform, these mirrors have to be spatially separated and extremely precisely positioned such that light reflected by one individual mirror on the first platform can be then redirected by a second individual mirror of the second platform and so on. Although practically possible, such arborescent structure is simply not economically or practically feasible considering the existing method of manufacture of the DMDs. Moreover, as would be readily appreciated by a skilled artisan, failure of an individual mirror detrimentally impacts the performance of either a MEMS-based optical switch or a DMD-based optical switch.

The use of a liquid crystal display (LCD) spatial light modulators (SLMs) is another venue available for light-path modulation. It employs the (re)orientation of high aspect-ratio molecules in response to an applied voltage to impart birefringence and rotate a vector of polarization of incident light. In conjunction with a series of linear polarizers, this SLM functions as an addressable switch, which either passes or blocks light beam(s) incident on subsections of the SLM. A 6×6 multimode ribbon fiber design has recently been described by (H. Chou et al., *J. Lightwave Technol.*, v. 30, pp. 1719-1725, 2012), which uses a custom molecule based phase SLM exhibiting 1 µs switching time but having a loss level of 20.5 dB, the 11.5 dB portion of which is inherent to the fan-out and polarizer/SLM design. Since this system uses light polarization as the switching mechanism, the light throughput is also extremely sensitive to variations in signal polarization, which is undesirable for many applications.

Therefore, the operational impediments of the existing technologies beg a question of how to implement an optical switch with the switching capabilities satisfying the N×M standard that requires no manual manipulation and exhibits switching speeds on the order of 10 microseconds and negligible performance impact due to mirror failure.

SUMMARY

An embodiment of the present invention provides a reconfigurable diffractive N×M optical switch including a two-dimensional (2D) array of micro-reflector elements that are positioned, in optical communication with and between an input surface containing N light inputs and an output surface containing M light outputs, according to a first pattern representing a Fourier transform of a second pattern formed by the M light outputs in the output surface. Generally, each of N and M can be greater than one. Such 2D array is structured such that, in operation, each micro-reflector element is defined by at least two spatial positions that include, respectively, first and second spatial orientations of the micro-reflector element at hand. The first spatial orientation is defined by a first angle formed by a micro-reflector element with respect to a reference plane and a first longitudinal position of the micro-reflector along a line inclined with respect to said reference plane, while the second spatial orientation is defined by a second angle formed by the micro-reflector element with respect to the reference plane and a second longitudinal position of the micro-reflector along the line. The first and second angles being equal for each micro-reflector element. In a specific implementation, each micro-reflector element is structured to be transitionable between the first and second spatial orientations in a piston-like fashion along a corresponding line that is transverse to a surface defined by all micro-reflectors elements when said all micro-reflector elements are in the same spatial position.

Embodiments of the present invention additionally provide a reconfigurable diffractive N×M optical switch that is operable to simultaneously redirect light from N light inputs to M light outputs by forming a light diffraction pattern that is congruent, in a surface containing the M light outputs, with a spatial distribution of the M light outputs. Generally, both N and M can be greater than one. Such optical switch contains a first two-dimensional (2D) array of micro-reflectors, an operation of each of which is defined by discrete spatial orientations of the micro-reflector. Each of the discrete spatial orientations including at least two discrete spatial positions. The first 2D array of micro-reflectors has a clear aperture containing N adjoining micro-reflector areas, each of which areas respectively corresponds to a corresponding light input from which light in such area is received. A micro-reflector area includes a multiplicity of micro-reflectors illuminated, in operation, with light from a respectively corresponding light input. The discrete spatial positions of micro-reflectors are defined to form, in diffraction of light incident from the N light inputs on the micro-reflectors, a diffraction pattern of light irradiance that is congruent with a spatial distribution of the M outputs in the surface.

Optionally, the 2D array of micro-reflectors is a digital micro-minor device and the at least two discrete spatial positions of a micro-reflector include a bi-stable spatial positioning defined by two angles of said micro-reflector with respect to a plane of the first 2D array such that (i) when the bi-stable spatial positioning is defined by a first angle, thee micro-reflector redirects light incident thereon towards a light output from the M light outputs to form a usable portion of redirected light diffracted towards the surface, and (ii) when the bi-stable spatial positioning is defined by a second angle, said micro-reflector redirects light incident thereon away from a light output from the M light outputs to form an unusable portion of redirected light.

Optionally, the at least two spatial positions include, for each micro-reflector, first and second spatial orientations, such that (a) the first spatial orientation is defined by a first angle formed by a micro-reflector with respect to a reference plane and a first longitudinal position of the micro-reflector along a line inclined with respect to said reference plane; (b) the second spatial orientation is defined by a second angle formed by the micro-reflector with respect to the reference plane and a second longitudinal position of the micro-reflector along the line; and (c) the first and second angles being equal for each micro-reflector. In a specific case, each micro-reflector of such diffractive optical switch is repositionable between the corresponding first and second spatial orientation by tangentially-parallel translation of said micro-reflector along the line. Alternatively or in addition, such specific diffractive optical switch may comprise a base disposed parallel to the reference plane under all micro-reflectors; and, optionally, a micro-reflector of such switch includes an upper element having a reflective surface and a lower element, where the upper and lower elements are in a fixed mutual orientation with respect to one another and repositionable, as a pair, along the line in response to a difference of electrical potential applied between the base and the lower element. Alternatively or in addition, in at least one of the first and second spatial orientations each micro-reflector is tensionally loaded.

Optionally, an embodiment of the switch contains (i) electronic circuitry, and (ii) tangible, non-transitory storage medium in operable communication with the first 2D array and containing computer program code thereon which, when used to govern an operation of the electronic circuitry, causes the electronic circuitry to orient the micro-reflectors of the first 2D array into spatial positions calculated based on data representing at least opto-geometrical parameters describing the performance and orientations of the M light outputs and N light inputs with respect to the first 2D array. The orientation of the micro-reflectors is effectuated such that to form, in diffraction of light incident from the N light inputs on the micro-reflectors, the diffraction pattern of light irradiance that is congruent with the spatial distribution of the M outputs in the surface in at least one order of diffraction. Examples of the diffraction pattern include a far-field diffraction pattern or a near-field diffraction pattern. In a related embodiment, the optical switch includes an optical dispersion compensator element disposed such that the light incident onto the micro-reflectors traverses said optical dispersion compensator element or, alternatively or in addition, a second 2D array that is structurally identical to the first 2D array. In the latter case, the first 2D array is positioned to receive light incident thereon from the N inputs at a first angle having a first magnitude and a first sign, the second 2D array is positioned to receive light redirected by the first 2D array at a second angle having a second magnitude and a second sign, and the first and second magnitudes are equal while the first and second signs are opposite such that a net angular deviation of light due to diffraction of light that has interacted with both the first and second 2D arrays, as measured at the surface, is substantially zero. An embodiment of the switch is operable with a switching time of about 10 microseconds.

Embodiments of the invention additionally provide a method for simultaneously switching light between N light inputs and M light outputs at a switching rate corresponding to a time of about 10 microseconds with the use of a two-dimensional (2D) array of micro-reflector elements disposed, along an intermediate plane, between and in optical communication with the M light outputs positioned in an output surface and N light inputs positioned in an input surface, each of the N light inputs being operably paired with a corresponding light output to form an ordered set of input-output pairs. At least one of N and M can be greater than one. Such method includes (i) determining a first function representing a distribution of the M light outputs; (ii) calculating a second function representing Fourier transform of said first function at the intermediate plane; and (iii) positioning of micro-reflector elements in a pattern represented by the second function. The method may optionally include diffracting light incident onto the 2D array from the N light inputs towards the M light outputs to form, in the output surface, an image diffraction pattern that is substantially congruent with the spatial distribution of the M light outputs. The process of diffraction may include phase-modulating a wavefront of the light incident onto the 2D array from the N light inputs while maintaining a distribution of intensity across said wavefront. The step of positioning may include positioning of micro-reflector elements in a pattern devoid of a spatial period equal to a size of an individual micro-reflector element.

Alternatively or in addition, the method may include modifying the distribution of the M light outputs to form an updated distribution to the M light outputs. Alternatively or in addition, the method may include translating at least one micro-reflector element of the 2D array from a first position to a second position along a corresponding direction that is transverse to an intermediate plane from a first position to a second position, such that the micro-reflector element remains tangentially-parallel to itself at any point between the first and second positions, to form a 2D array the micro-reflector elements of which are positioned according to an updated second function that represents a Fourier transform of an updated first function, the updated first function representing the updated distribution of the M light outputs

BRIEF DESCRIPTION OF THE DRAWINGS

The invention will be more fully understood by referring to the following Detailed Description of Specific Embodiments in conjunction with the not-to-scale Drawings, in which similar elements are indicated with similar numbers and labels and of which.

DETAILED DESCRIPTION

The present invention solves the long-felt industrial need of an optical switch with no manual manipulation and exhibiting negligible performance impact due to mirror failure by providing a reconfigurable (at speeds on the order of about 10 microseconds) N-input-to-M-output (or N×M) optical switch that is (i) based on a single digital micro-mirror platform having a multiplicity of individual micro-minors thereon each of which is operating in a binary mode defined by the two stable spatial orientation, and that is (ii) structured to form a light diffraction pattern (at the user's discretion, in the near-field or far-field) that is congruent with the spatial distribution of the M outputs. Embodiments of the present invention, therefore, enable the simultaneous redirection of light from N light inputs to N light outputs with the use of a single-platform DMD device. The idea of the present invention stems from the realization that, when the multiplicity of binary reflectors of a single DMD device are controlled not as a periodic array but individually to form a pattern the spatial properties of which ensure that the distribution of light diffracted on the multiplicity of individual reflectors substantially coincides (whether in the far-field or the near-field) with the spatial positioning of the N outputs (located, respectively, in the far-field or near-field with respect to the DMD device), the operational limitation of the conventional 1×M switching of the DMD device is unexpectedly overcome. Accordingly, in one implementation, the formation of the (far- or near-field) diffraction pattern defined by the spatial coordination of the M outputs is effectuated by arranging the multiplicity of individual micro-minor elements of the device into a spatial formation or pattern governed by a solution to the problem of light propagation upon diffraction (such as diffraction of a light wavefront incident onto the DMD platform from the N inputs upon propagation to the desired far- or near-field where the M outputs are located and/or vice versa). As used herein, the term substantially is defined as a term referring to a value, of a parameter to which the term substantial refers, measured with means and/or methods recognized for such measurement and taking into account measurement errors typical for such measurement. For example, the reference to a value of optical dispersion as being substantially equal to zero implies that, when measured according to methods used in related art for such purpose, the value of the optical dispersion is found to be zero within a typical experimental error.

Figure 1:
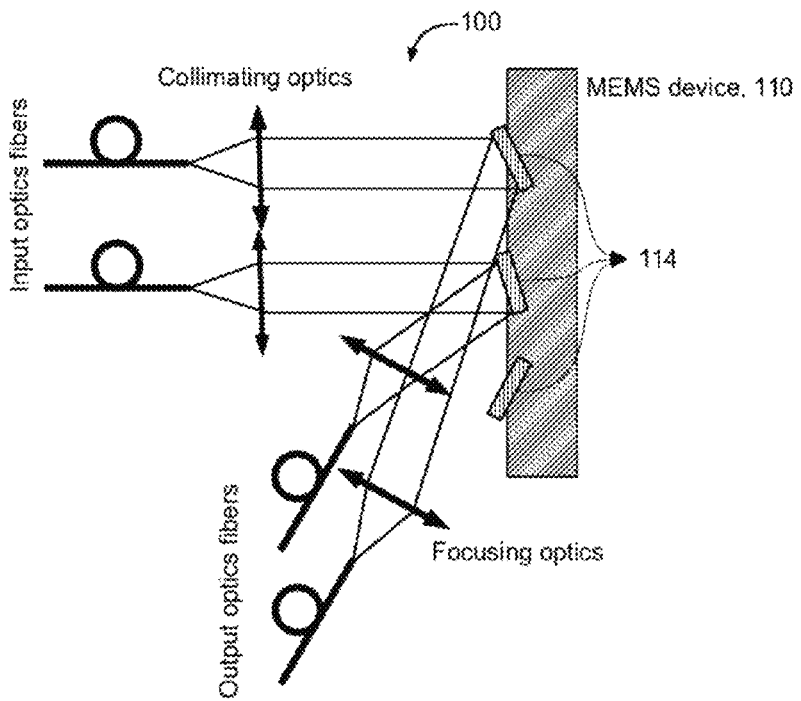
FIG. 1 is a schematic illustration of an optical 3D MEMS switch.

In reference to FIG. 1, illustrating schematically an optical switch 100 based on a MEMS-device 110, the actuation of an individual mirror (reflector) 114 is analog in nature in that the individual mirror can assume substantially any spatial position between the two extreme positions defining the range of operation of the individual reflector 114. Accompanying such analog operation, there are inherently poor spatial stability of a chosen angular orientation of an individual reflector 114 (which is subject to external perturbations) and the operationally-limited number of input/output ports of the device 100 (which is subject to the maximum angle of deviation of the individual reflector from its reference, neutral position). The currently prevalent MEMS architecture is also operationally limiting in terms of the amount of light that the individual reflector can handle (too high the incident intensity will simply damage the surface of the reflector), and does not allow for operational redundancy in that the failure of one individual reflector understandably leads to the failure of the operation of a corresponding port, which leaves the whole switch impaired in some cases. The latter issue, in turn, practically limits the number of individual reflectors in a single device and the number of in/out ports that the device can serve. The relatively low switching speed of operation (on the order of 50 milliseconds) of the device 100 is defined by the large (on the order of 500 micrometers, see for example www.nt-t.co.jp/milab/en/project/pr05_3Dmems.html) dimensions of the individual reflectors 114, while hinges enabling the tilt of the reflectors 114 are known to be subject to fatigue and mechanical failure.

In comparison, a conventional digital micro-mirror device includes a chip that has on its surface up to several hundred thousand microscopic mirror elements arranged in an array that correspond to the array of pixels in the image to be displayed. The mirror elements can be individually rotated in a binary fashion (for example, within the range of ±10-12°): to an "on" or "off" state. In the "on" state, in operation, light incident onto the DMD is reflected into the lens towards the plane of interest (for example, a screen), making the corresponding pixel on the screen appear bright. In the "off" state, the light is directed elsewhere (usually onto a heatsink or light-block), making the corresponding pixel appear dark. Therefore, by its very nature, a conventional DMD device is structured to redirect light incident thereon by means of amplitude modulation. In operation, the individual micro-minor elements of the DMD are controlled (rotated) in groups within each of which the individual micro-minor elements are positioned the same way and, therefore, form a spatial pattern with a period substantially equal to the size of a single individual micro-minor element.

In stark contradistinction with a conventionally-structured DMD device, an embodiment of the present invention employs a DMD device that is structured as at least one of an amplitude-modulating device and a phase-modulating device, as further discussed in detail below. The electromagnetic field diffracted by a given patterned surface behaves in a manner governed by and predictable based on the scalar diffraction theory. A spatial distribution of the N outputs (to a combination of which, defined in real time by the instant need of the network, light diffracted by an embodiment of the DMD device has to be coupled) defines an image diffraction pattern to be formed in the image space by light transferred by the DMD device from the light inputs associated with the switch. According to an embodiment of the invention, positions of individual reflectors (micro-minors) across the DMD employed in the switch are determined, also in real-time, via the judicious back-calculation by performing a Fourier-transform of the image diffraction pattern, which transform takes into account propagation of light through the optical space present between the DMD device and the light outputs. Aggregately, the positions of the individual reflectors, corresponding to such network-required instant combination of light outputs, form a pattern referred to herein as a holographic pattern and defined as a spatial pattern formed by orienting the individual reflectors of the DMD device such as to produce an image diffraction pattern that is congruent with the required operational spatial distribution of the outputs associated with the switch. As the operation spatial distribution of the outputs may change in time depending on the needs of the overall network, in operation of the switch the holographic pattern is updated (reconfigured) at rates defining the switching time of the DMD device.

Figure 2B:
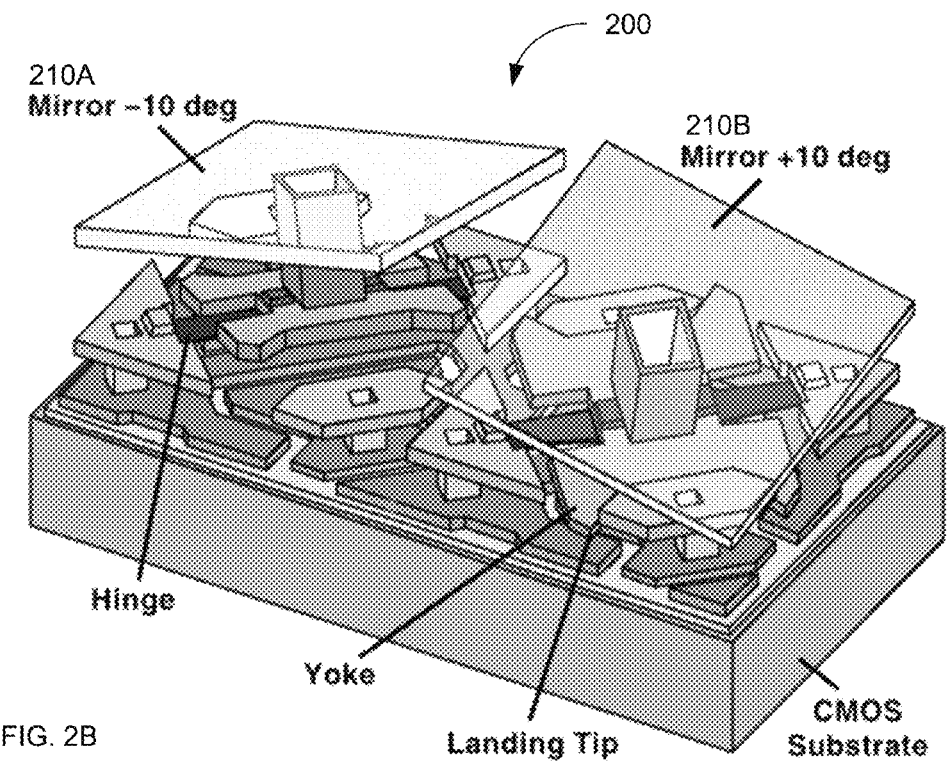
FIG. 2B is a depiction of a portion of a bi-stable DMD (Texas Instruments)
Figure 2A:
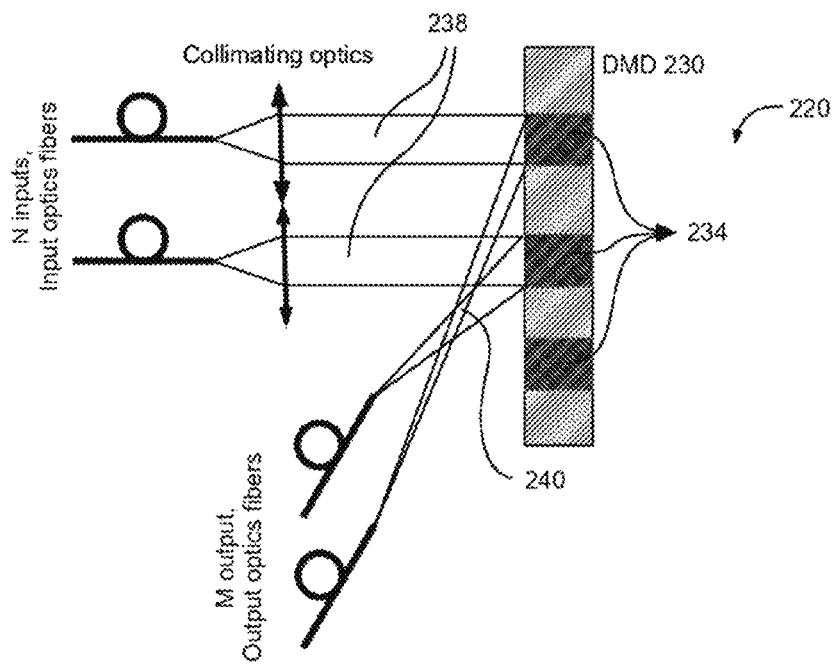
FIG. 2A is a diagram illustrating schematically a diffractive DMD-based optical switch according to an embodiment of the invention.

FIG. 2A provides a general diagram schematically illustrating an embodiment 220 of an N×M optical switch based on the DMD device 230 structured according to the idea of the invention. As already alluded to, in order to step over the limitation imposed by the conventional method of operating the amplitude-modulating DMD device, the multiplicity of individual micro-minors of the device 230 are oriented according to a holographic pattern 234 that is dependent and calculated based on at least the spatial positioning of the M outputs towards which the device 230 is configured to diffract the incident light 238 such as to couple the diffracted light 240 therein. While the outcoupling (focusing) optical element(s) is/are not shown in the diagram of FIG. 2A, such element(s) may generally be present, depending in part on whether the M outputs are located in the near- or far-field with respect to the DMD device. As will be discussed below, a particular implementation of the switch of the invention may employ a DMD-embodiment 230 structured as an amplitude-modulator and operable to form the image diffraction pattern, in the plane of the M outputs, by amplitude-modulating the incident light 238. Alternatively or in addition, the switch of the invention may employ a DMD device 230 structured as a phase-modulator and operable to form the image diffraction pattern, in the plane of the M outputs, by phase-modulating the incident light 238. Alternatively or in addition, an embodiment 230 can be structured to operate in a mixed, combined mode such that, for example, a first portion of the multiplicity of the micro-minors of the DMD 230 is structured to amplitude-modulate light 238 incident thereon, while a second portion of the micro-minors of the DMD 230 is structured to phase-modulate light 238 incident onto these micro-mirrors. Yet another example of the mixed-mode embodiment of the DMD 230 of the invention includes at least one micro-minor structured to operate by modulating the incident light 238 in at least one of amplitude- and phase-fashions.

EXAMPLE 1

Embodiments Operating by Modulating the Amplitude Distribution Light Input.

Figure 2C:
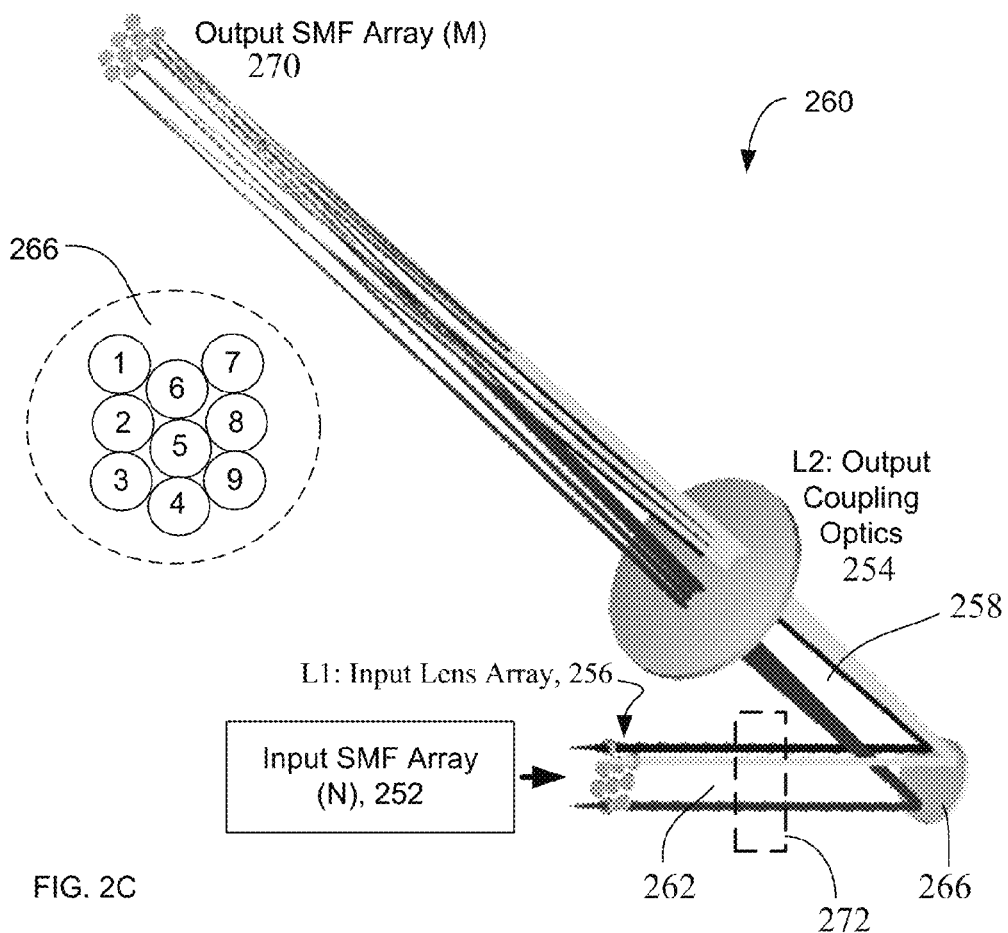
FIG. 2C is a schematic perspective illustration of light propagation through an embodiment of the invention.

FIG. 2B is a diagram schematically illustrating a portion 200 of an amplitude-modulating version of the DMD device (each reflector of which operated in a bi-stable regime, as discussed above) that includes two reflectors 210A, 201B. FIG. 2C illustrates a practical implementation 260 of a 9×9 switch of the invention that includes the outcoupling optics 254. Referring now to FIG. 2C, input light 262 (in this example, at a wavelength chosen within the telecommunication C-band of 1530-1565 nm from at least one of the nine input single-mode fibers, SMFs 258, and collimated with an array of respectively-corresponding nine 4 mm diameter, 12 mm focal length lenses 256) was passed in the form of nine collimated beams to the respectively-corresponding adjacent sub-areas 1 through 9 of the amplitude-modulating DMD device 266 (as illustrated in the inset of FIG. 2C). The DMD 266 (Texas Instruments DLP7000) included a 2D 1024×768 array of 13.68×13.68 $\mu m^2$ sized minors each operating, as discussed above and referring again to FIG. 2A, in discrete addressable minor positions with a fill factor of about 92%. A fill-factor is understood to be a ratio of the usable (minor-occupied) area of the clear-aperture of the DMD device to the area between individual mirrors (gaps); it can be increased by, for example, reducing the gaps between immediately adjacent micro-mirrors. Based on the cross-sectional dimensions of the collimated input beams, it was estimated that each of the sub-areas 1 through 9 contained on the order of 40,000 or so of individual micro-mirrors. A 250 mm focal length lens 254 (L2) was positioned to reimage the distribution of light 258 diffracted by the holographic pattern of the DMD 266 onto the set 270 of discrete points (defined by the 9 outputs associated with the embodiment of this switch) at a focal plane of the lens 254, with appropriate magnification. Individually-addressable operating positions of each of the individual reflectors of the DMD 266 were updated according to a binary amplitude computer-generated holographic pattern defined by the set 270.

In order to switch a chosen portion (i.e., one of the nine input beams) of the input signal 262 from one output port to another, the identified subset of pixels or individual micro-mirrors (i.e., the sub-area from the sub-areas 1 through 9) of the DMD 266 that is operationally devoted to that specific input port was reset independently from the remaining pixels, resulting in substantially no operational loss of signal from other input ports. The mirror reset was a two-step process, which included (i) loading new data representing the required-at-the-time light output port configuration onto the tangible, non-transitory storage memory unit (such as CMOS memory, for example) associated with the circuitry governing the operation of the switch and (ii) updating the mirror positions by sending reset electrical pulse(s) to the mirrors involved in such reset. The new data may represent a pre-calculated and optimized binary hologram pattern stored, for example, in a look-up table, thereby eliminating the need for the on-the-fly computations. Upon receiving the reset pulse(s), the switching speed for the identified subset of micro-mirrors corresponded to the sum of the first time period required for a micro-mirror to physically change its position and the second time period required for the micro-mirror to settle. Empirically, the resulting overall single-mode fiber switch time of the embodiment 260 was demonstrated to be 11.51 $\mu s$.

In order to determine the positions of multiple individual reflectors of the DMD device 266 corresponding to the holographic pattern as defined, the phase information of the result of the Fourier transformation procedure can be discarded, the amplitude information is to be "binarized", and the spatial profile of the holographic pattern can be discretized to correspond to the actual dimensions of the DMD pixels/mirrors and spacing between them.

The result of the discretization of the spatial profile of the determined holographic pattern defines a specific set of the DMD-device-dependent spatial frequencies that can be combined to approximate the desired spatial frequency of the diffraction pattern at the image plane. It is understood that the combination of spatial frequencies in this implementation generally takes the form of a linear superposition of available spatial frequencies where various combinations can be used to approximate the same field.

Figure 3:
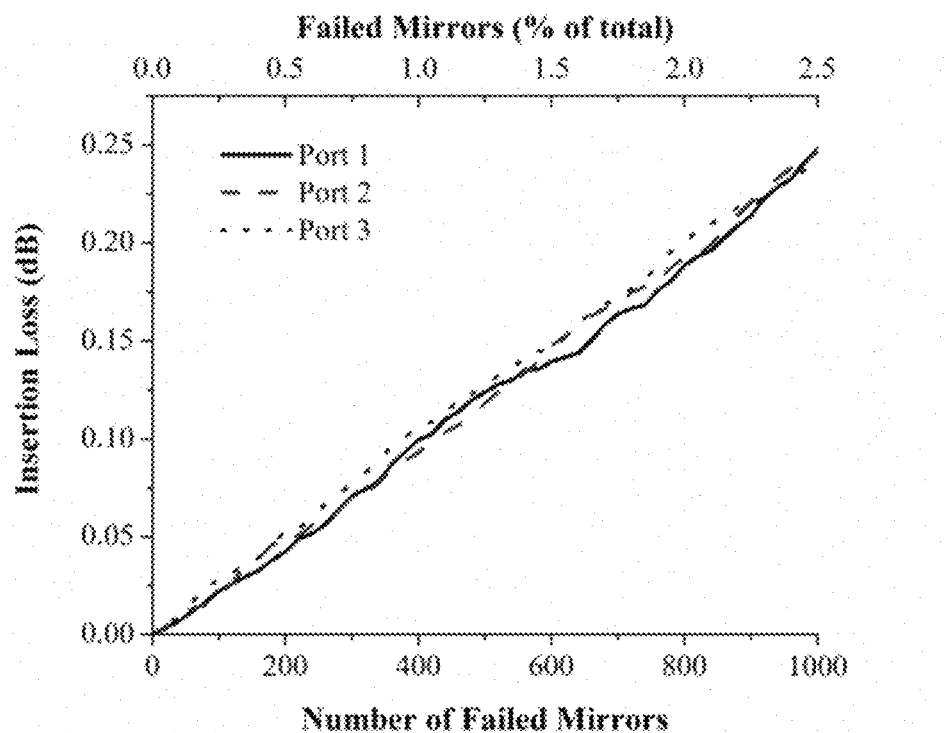
FIG. 3 is a plot showing the results of analysis of intensity variation of light, delivered via diffraction by an embodiment of the invention to the image (output) plane and the corresponding insertion loss due to randomized failure of mirror(s) of the embodiment of the amplitude-modulating DMD for three output port locations.

To determine the optimal superposition further geared toward reduction of crosstalk and optimized output uniformity of operation, in one embodiment the output-output algorithm kernel variation of the standard Gerchberg-Saxton Iterative Fourier Transform Algorithm was utilized (see, for example, Fienap, Opt. Eng., v. 19, pp. 297-305, 1980; or Kettunen, Opt. Eng., v. 43,p. 2549, 2004). In operation, this algorithm iterates through discrete Fourier transform calculations while adjusting the previous solution in an attempt to decrease the crosstalk error function and facilitates the minimization of crosstalk between channels to below the noise floor of the available measurement devices (resulting, in practice, in an isolation figure greater than 40 dB). An analysis of the beam intensity variation (as a input beam from the input 262 was directed to different locations across the output, image plane corresponding to the set 270 of FIG. 2C) evidenced, as shown in FIG. 3, good uniformity of the operation of the switch with a maximum variation of 0.3 dB observed across all possible output fiber locations 270 and practically independent from the number of the failures of the individual micro-minors. Such unexpectedly high uniformity on this scale, which does not have any analog in and is unanticipated by the related art, indicates that an embodiment of the invention is fully capable of supporting the industrial transition to increased port counts and fiber densities as required by the currently unmet needs of the telecommunication networking. Additional operational features of the switch such as, for example, (i) a capability to divert a pre-defined portion of the input light to an optical detector for in-situ monitoring, (ii) integrating a variable-attenuation mechanism for optical signal balancing, and (iii) re-alignment of the system directed to compensate for changes in ambient temperature and/or other environmental change are also within the scope of the invention and can be determined with the use of the same algorithm.

The binarization of the pattern may cause multiple diffracted orders (or minor images) to appear in the image plane associated with the set of outputs (the set 270 in FIG. 2C) and possibly somewhat limit the viable switching space to, for example, one half of the accessible area within the switching region and lead to some degree of cross-talk between the outputs, which should be taken into account in designing a specific embodiment of the switch. Another imaging artifact may be caused by the less-than-100% fill factor of the practically-implementable DMD, in that diffraction of light at a spatial gap between the immediately adjacent micro-minors occurs at high diffraction angles and towards a portion of imaging plane that is outside of the group of the N outputs. The periodic occurrence of the inter-minor gap causes an additional spatially-repeating light-pattern to appear in the output/image plane mostly outside of the region associated with the N outputs and, therefore, be substantially unused for the purposes of optical switching.

Figure 4:
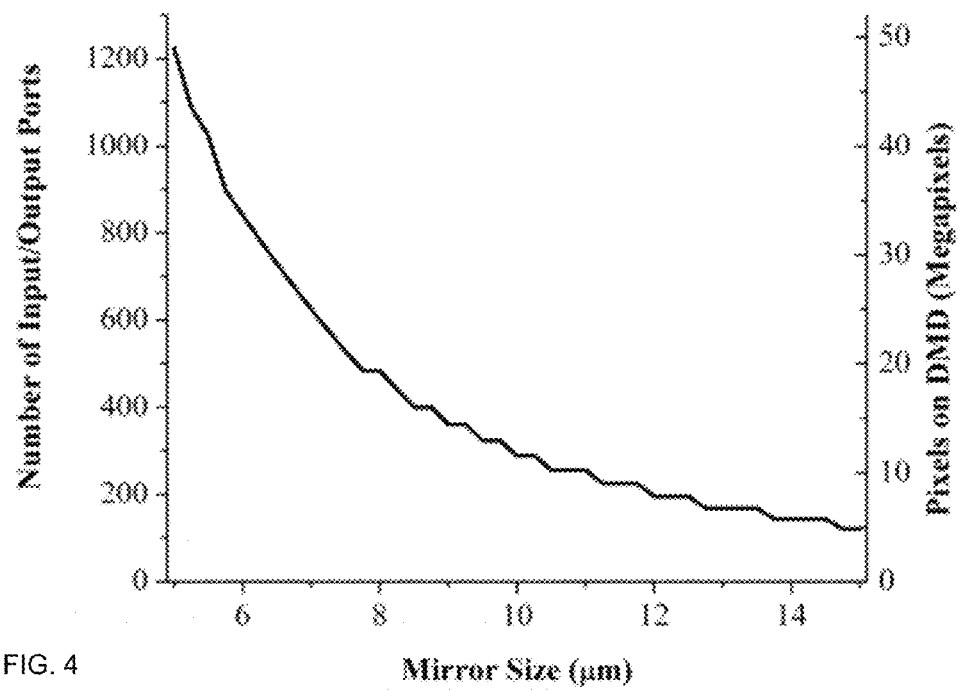
FIG. 4 is a plot representing the results of the scalability study performed on the diffractive optical switch (that employs the amplitude-modulating DMD according to an embodiment of the invention) with respect to the size of the individual micro-mirrors of the DMD and the corresponding size of the DMD. The analysis takes into account the numerical aperture of input/output ports (single mode fibers in this example)
Figure 5:
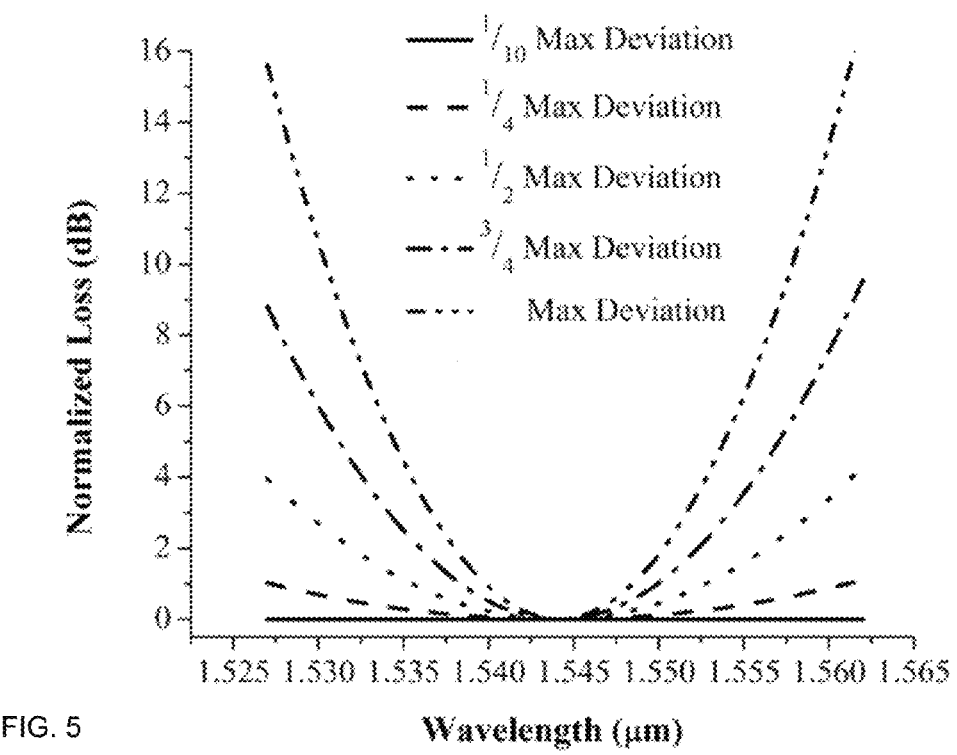
FIG. 5 includes plots showing the results of the analysis of the single-mode fiber coupling loss (as a function of signal wavelength across the output plane) due to optical switching with the use of a DMD according to the embodiment of the invention. Increase in deviation corresponds to increase in spatial frequency associated with lightfront at the plane of the DMD.

Free-space optical switching and the holographic implementation of the DMD device according to the idea of the invention enable scaling of the operation of the proposed system and its practical applicability to port counts in the hundreds. FIG. 4 is a plot representing the results of the scalability study performed on the switch 260 with respect to the size of the pixels (individual micro-minors or reflectors) and the corresponding size of the DMD 266. As individual pixels of the DMD become reduced in size, the maximum spatial deviation $\theta_{max}$ of the beam of light diffracted on such pixels increases, according to $\sin\theta_{max}=\lambda/(2*\text{pixel size})$, where pixel size is the size of an individual micro-mirror. The term "maximum deviation" refers to the largest angle at which the beam incident onto the DMD 266 can be deflected. FIG. 5 illustrates the results of analysis of the SMF coupling loss across the output plane of the set 270 of FIG. 2C, normalized to the lowest loss-figure and associated with different levels of maximum deviation. An increase in deviation corresponds to a higher spatial frequency associated with a given embodiment of the DMD device. The higher the deviation of the diffracted light, the larger the space that can be operationally accessed in the output (image) plane.

There exists a direct correlation between the number of input ports and the necessary pixel count. In further reference to the embodiment of FIG. 2C, each input port beam from the input 262 requires an array of DMD pixels on the order of 200×200 for the operationally meaningful beam localization. The analysis was performed based on a square grid of fibers 270 at the output plane with center-to-center distance equal to the diameter of the fiber cladding and a maximum acceptance angle based on the SMF numerical aperture of 0.14. These results indicate that with the currently utilized pixel dimension of 13.68 µm the switch of the invention can support the switching of light from any one of 144 input fibers to any of one 144 output fibers. Considering the current availability of the DMD devices with over 2 Megapixels, spatially tiling of (positioning side-by-side), for example, three DMD devices would allow us to create a 144×144 optical switch.

EXAMPLE 2

Optional Use of a Dispersion Compensator

Using the embodiment 260 of FIG. 2C discussed above as a non-limiting example, it is worth noting that one of the application-specific parameters affecting the overall coupling efficiency associated with the switch is the spectral distribution of the light input 262. The relationship among the wavelength $\lambda$, a parameter $\zeta$ related to the spatial frequency associated with the holographic pattern at the DMD 266 and the angles of incidence and diffraction at the holographic pattern ($\theta_i$ and $\theta_d$, respectively) is given by $\lambda\zeta=\sin\theta_d-\sin\theta_i$). Since the angle of diffraction is dependent on the illumination wavelength, the image location in the output (image) plane is also dependent on the wavelength and spatially shifts by a distance that is related to the focal length of the lens. This spatial shift can be generally corrected in a system switching light characterized by a small spectral bandwidth via adjusting the holographic pattern on the DMD, but in applications that may require the transmission and switching of light across the entire C-band, correcting the spatial shift of the output at one wavelength may affect the spatial shift associated with the position of the output at another wavelength.

In order to mitigate wavelength-dependent coupling loss characterizing a specific implementation of the switch of the invention, a compensating diffractive element 272 can be optionally disposed, for example, across the direction of propagation of a light beam between a lens of the array 256 and the DMD 266 (not shown in FIG. 2C). Such diffractive compensator is judiciously designed to impart a wavelength-dependent angular deviation onto the beam of light incident thereon such as to deflect light at longer wavelengths at higher angles. In the case of using such diffractive wavelength-dependent compensator, portions of the overall input 262 corresponding to different wavelengths now have various angles of incidence upon the surface of the DMD 266, with light at the longer wavelengths having a smaller angle of incidence than shorter wavelengths. As a result, light at these wavelengths is deflected less by the DMD 266 than light incident onto the DMD 266 at higher angles of incidence. This balance between wavelength and angle-dependent diffraction at the DMD 266 causes light portions at various wavelengths to propagate substantially collinearly from the DMD 266 and facilitates the focusing of different spectral components of light 258 at the same output port location.

Figure 6:
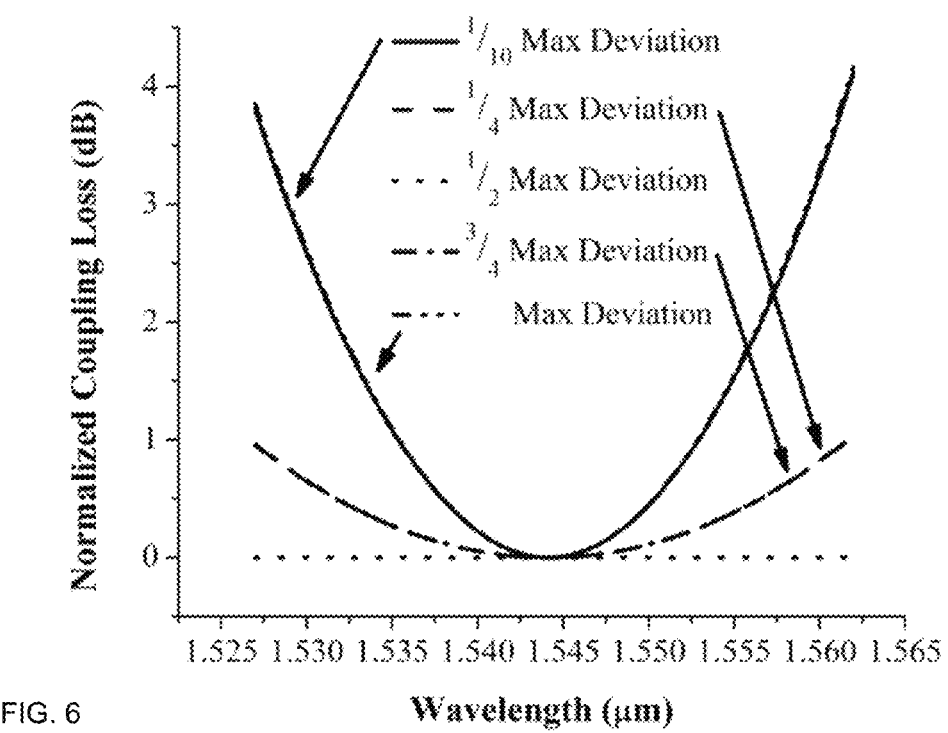
FIG. 6 includes plots showing the results of the analysis of the single-mode fiber coupling loss (as a function of signal wavelength across the output plane) due to optical switching with the use of a DMD and an dispersion compensator according to the embodiment of the invention.

To this end, FIG. 6 presents a plot illustrating the results of analysis of the SMF coupling losses, in the embodiment of FIG. 2C with the added dispersion compensator, as a function of input wavelength across the output (image) plate of the set 270, normalized to the lowest loss figure. Comparison with the operational characteristics of the embodiment 260 of FIG. 2C in absence of the dispersion compensator, shown in FIG. 5 provides evidence that the advantageous increase of the throughput of light through the switch in some bandwidths of the considered wavelength range is as high as sixteen-fold. This particular implementation of the diffractive compensator was designed to flatten the wavelength-dependent loss at a location central to the input beam bundle 262 in order to reduce the magnitude of the effect across the entire range of the locations of the outputs 270.

Unlike in the case of a 3D-MEMS, the operation of the device of the invention discussed above does not require a feedback positioning loop, relying instead on precisely located physical stoppers corresponding to the two mirror states. The device of the invention provides switching orders of magnitude faster and consumes significantly less energy than a 3D-MEMS device. In addition, since the DMD of the invention diffracts light in reflection, the overall system exhibits minimal polarization-dependent loss (PDL). Employing the diffraction as the light-redirecting mechanism provides the user with the freedom to implement a variety of ancillary features into the switch system, such as dynamically provisioning a pick-off beam for signal monitoring purposes, simultaneously sending data to more than one output for multicasting applications, and integrated variable attenuation control.

EXAMPLE 3

Holographic Patterns

Figure 7A:
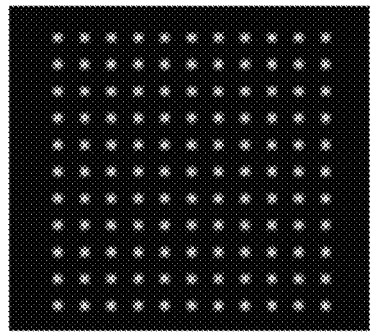
FIGS. 7A, 7B, and 7C show several examples of spatial distributions of light-output(s) (in the image/output plane of the diffractive switch employing the amplitude-modulating DMD structured according to an embodiment of the invention) and respectively-corresponding holographic patterns according to which the mirrors in the amplitude-modulating DMD are positioned to achieve these spatial distributions.
Figure 7A:
Figure 7A:
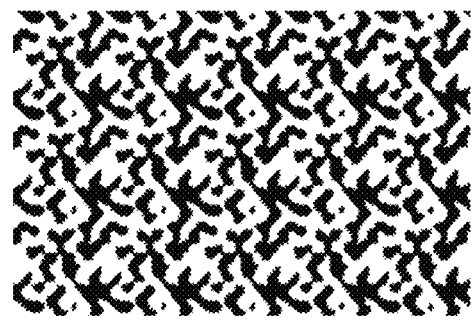
Figure 7B:
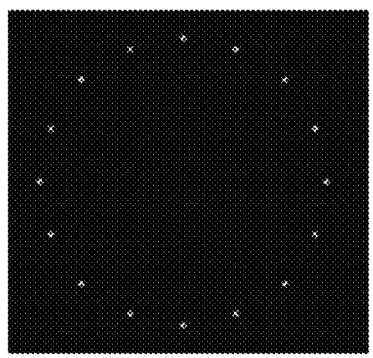
Figure 7B:
Figure 7B:
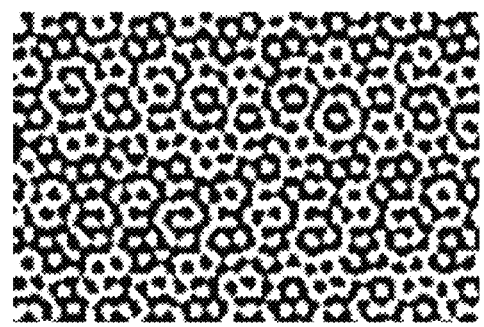
Figure 7C:
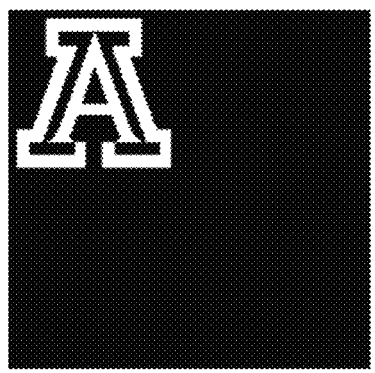
Figure 7C:
Figure 7C:
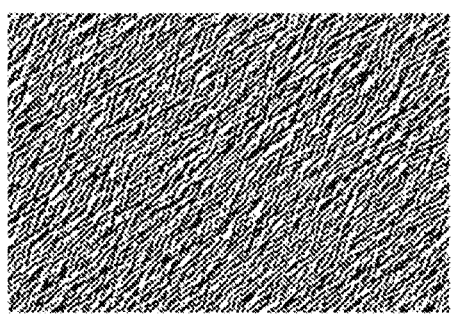

For the purposes of illustration, each of the FIGS. 7A, 7B, 7C present, in the left-hand-side, a spatial pattern of outputs into which light, diffracted at the DMD (such as the DMD 266 of FIG. 2C) has to be coupled by the Fourier lens 254. The right-hand-side portion of each of FIGS. 7A, 7B, and 7C demonstrates a respectively-corresponding black-and-white holographic pattern which, once used to set the orientation of the multiplicity of the individual micro-mirrors of the DMD 266, will ensure the diffraction of incident light 262 at the DMD that in the far-field form the intensity distribution congruent with the pattern displayed in the left-hand-side of the corresponding figure. The black areas of the holographic patterns of FIGS. 7A, 7B, 7C represent those micro-mirrors of the DMD that are tilted to the "off" position, and do not redirect the incident light towards the output plane, while the white areas are associated with the "on" micro-mirrors, reflecting incident light towards the N-outputs. In stark contradistinction with any arrangement discussed in the related art, while spatial symmetry of the arrangement of the multiple (N) outputs may impose a certain degree of spatial periodicity on the respectively corresponding holographic pattern utilized by an embodiment of the invention, no embodiment of the invention utilizes such positioning of the individual micro-mirrors that has a period comparable to the spatial size of the individual micro-mirror. In other words, any spatial period that may characterize the pattern according to which the micro-minors of an embodiment of the invention should be organized to achieve the required switching is larger (for example, by at least a factor of two, or even higher) than a dimension of the individual micro-minor element. In fact, a conventional "binary" DMD the groups of micro-minors of which are oriented according to patterns having spatial periodicity of a size of a single individual micro-mirror does not diffract light incident on the micro-minors from the N-inputs such as to produce a diffraction pattern, in the plane of the N-outputs, that is congruent with the spatial orientation of the N-light-outputs. Therefore, an amplitude-modulating binary DMD device, the minors of which are not oriented according to the holographic pattern as defined, is not suited to reproduce the results of the present invention.

EXAMPLE 4

Figures 8A, 8B, 8C:
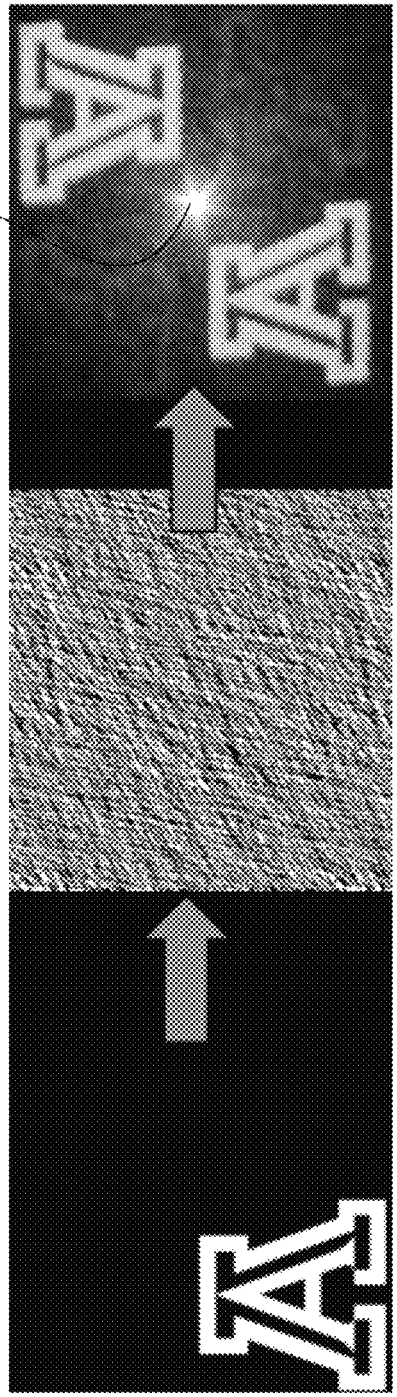
FIGS. 8A, 8B, and 8C provide, respectively, examples of another spatial distribution of an output of the diffractive switch system (which employs an amplitude-modulating DMD structured according to the embodiment of the invention) in the image/output plane; a holographic pattern of micro-mirrors of the DMD calculated based on such spatial distribution of the output; and an image diffraction pattern (+1, −1, zero orders) formed, in diffraction of light incident onto the plane of the DMD, in the output plane.

Amplitude-Modulating Embodiment Operating in the Visible Portion of Optical Spectrum To validate the functionality of an embodiment of the proposed switch in the visible portion of the spectrum, 1×9 switch operable at about 532 nm was implemented. As a benefit of testing the embodiment at visible wavelength(s) there was gained the ability to map out the alignment tolerances required for optimal switch performance using visual feedback. FIGS. 8A, 8B, and 8C show, respectively, an example image (i.e., the required visible light intensity distribution in the output or image plane), the calculated holographic pattern according to which the micro-minors of the DMD device have to be arranges, and the actual image formed in the image plane as a result of diffract of light on the so-configured DMD upon illumination of the DMD with the coherent light at 532 nm. The bright point P in the center of the diffracted image of FIG. 8C corresponds to the zeroth order beam diffracted on the holographic pattern of the DMD device, while on the sides of the point P there can be seen the +1 and −1 diffracted orders, each formed with the expectedly high uniformity of intensity across the field.

Figure 9:
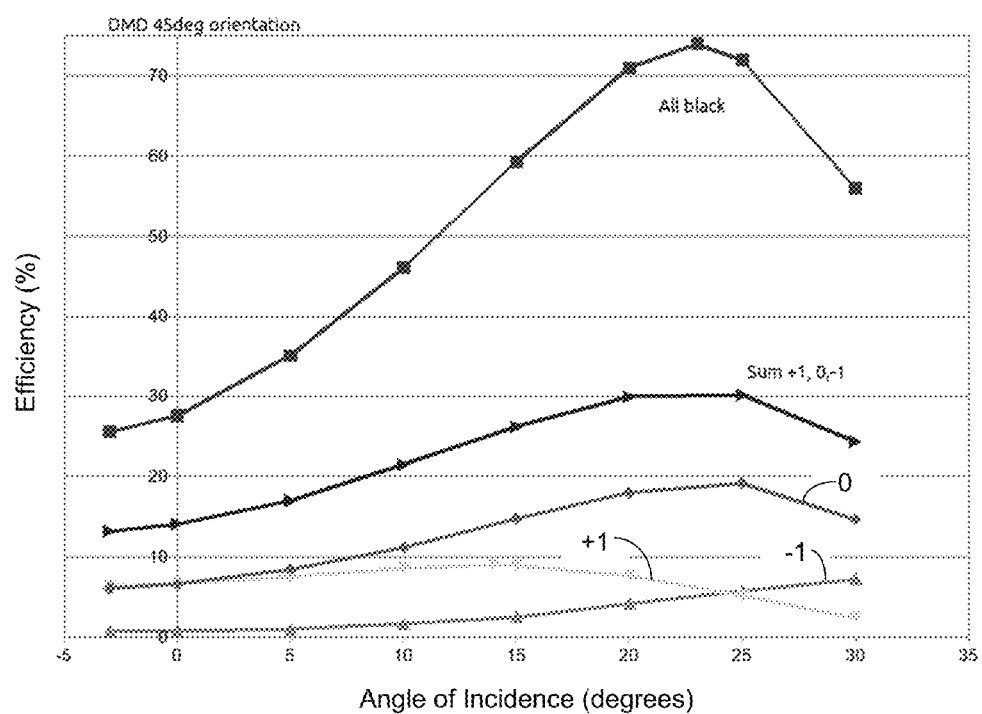
FIG. 9 includes plots showing dependency of diffraction efficiency of different combinations of diffractive orders as a function of angle of incidence of light onto the DMD device structured according to an embodiment of the invention.

Due to the minor-tilting structure of the holographic pattern on the amplitude-modulating DMD, the diffracted energy can be distributed among the diffraction orders differently. The re-partition of the diffracted energy among the orders as a function of the angle of incidence of the input beam onto the DMD is shown in FIG. 9. Here, curve A represents the efficiency corresponding to the operation of the amplitude-modulating DMD device all mirrors of which have similar spatial orientation (i.e., not according to a holographic pattern) and which, therefore, operates in a reflection mode—and not in a diffraction mode as required by the embodiment of the invention. Curves labeled +1, −1, 0, and Sum represent the operation of the embodiment in a diffraction mode.

Figure 10:
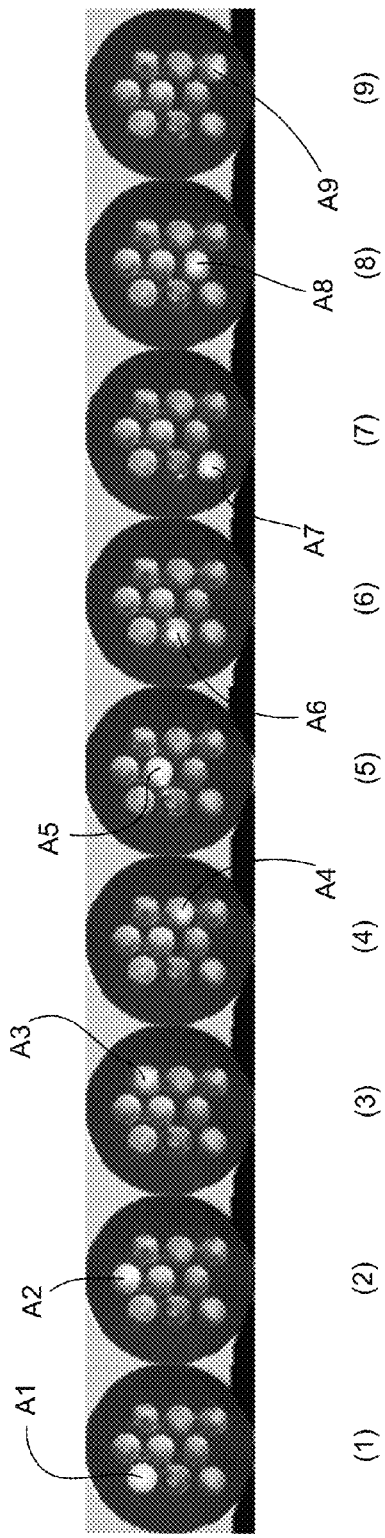
FIG. 10 provides images illustrating empirical results of sequential switching of visible light from a single input port to nine output ports with the use of an embodiment of the DMD.

The time-sequence of images 1 through 9 of FIG. 10 illustrates the facet of an optical component corresponding to the set of the output SMFs to one of which the light at 532 nm was coupled, upon the diffraction on the embodiment of the discussed 1×9 switch. The light switching is evidenced by the highlighted fiber "$A_i$".

EXAMPLE 5

Embodiment Structured to Operate by Modulating a Phase Distribution of Incident Light In a fashion similar to that described in reference to an amplitude-modulating embodiment of the DMD, an embodiment of the micro-mirror device that is structured to operate as a device modulating the phase distribution of light incident thereon has an updatable, in response to the immediate need of the networking system, pattern of individual micro-mirrors which pattern (referred to as a holographic pattern) is calculated based at least in part on the Fourier transform of the spatial distribution of the M outputs of a diffractive switch employing such DMD. In a fashion similar to that described above in reference to an amplitude-modulating version of the DMD, such phase-modulating MOEMS structure is devoid of a periodic mirror-formed spatial pattern the period of which is equal to the size of an individual micro-mirror. At least one of N and M can be greater than one. In practice, each of N and M are greater than one.

By analogy with FIGS. 7A, 7B, and 7C, FIGS. 14A, 14B, and 14C show, in the left-hand-side, a spatial pattern of outputs into which light, diffracted at the phase-modulating version of the device of the invention (such as the "piston" device 1100 of FIG. 11A, for example) has to be coupled. The right-hand-side portion of each of FIGS. 14A, 14B, and 14C demonstrates a respectively-corresponding gray-scale (not black-and-white, in contradistinction with FIGS. 7A through 7C) holographic pattern which, once used to set the orientation of the multiplicity of the individual micro-mirrors of the DMD 1100, will ensure such diffraction of light 1110 incident onto the DMD 1100 that in the far-field forms the intensity distribution congruent with the pattern displayed in the left-hand-side of the corresponding figure. The gray scale represents phase differences on the scale from 0 (zero) to 2 pi (with the latter corresponding to one wavelength of 1550 nm light). For a "piston" device 1110 such phase difference translates to a range of the individual mirror displacement, along the post 1130, from 0 nm to 775 nm.

Figure 11A:
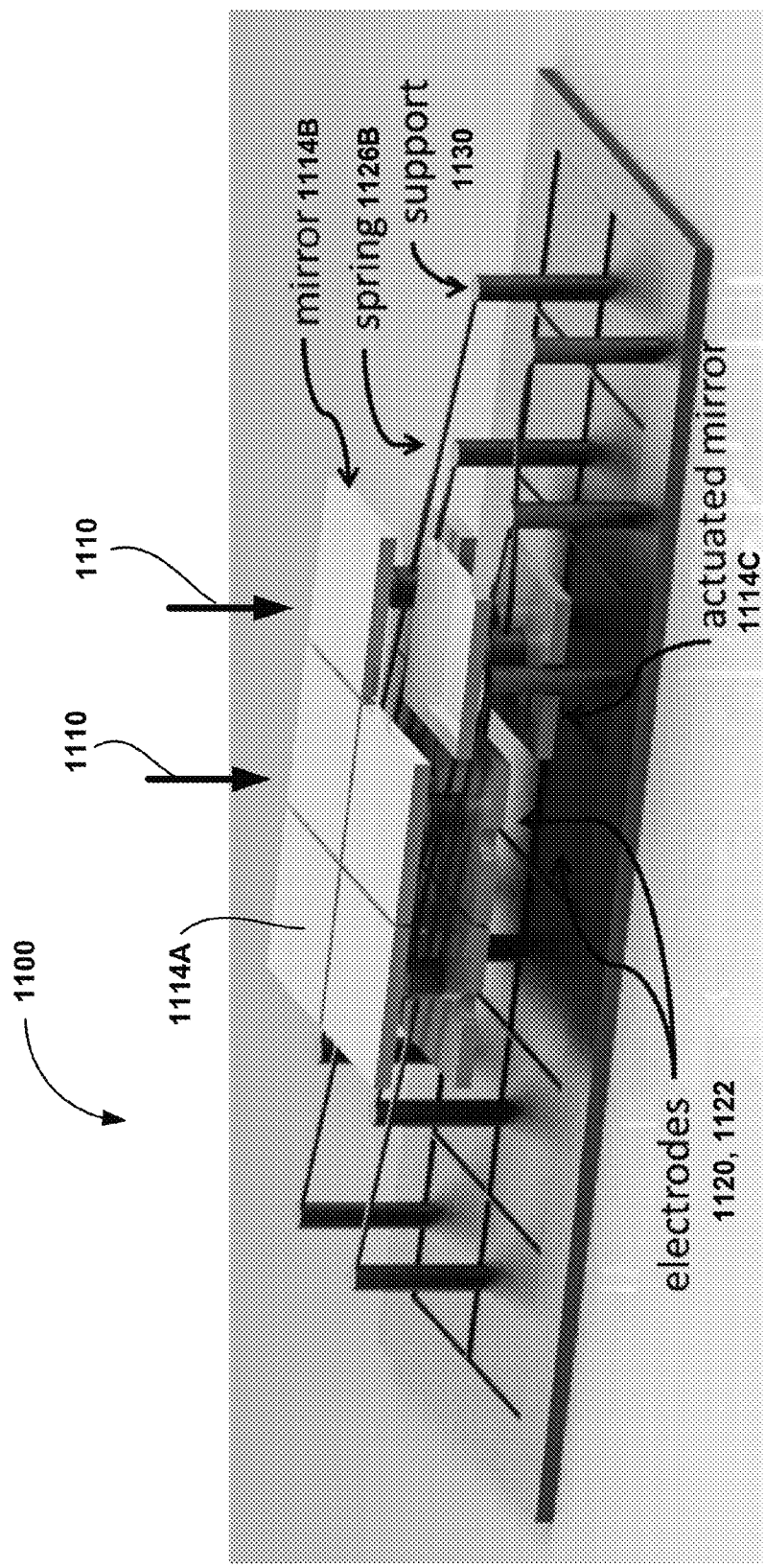
FIGS. 11A, 11B show, in perspective and side views, an embodiment of a phase-modulating micro-opto-electromechanical systems (MOEMS) such as a DMD structured and operating according to the idea of the invention.
Figure 11B:
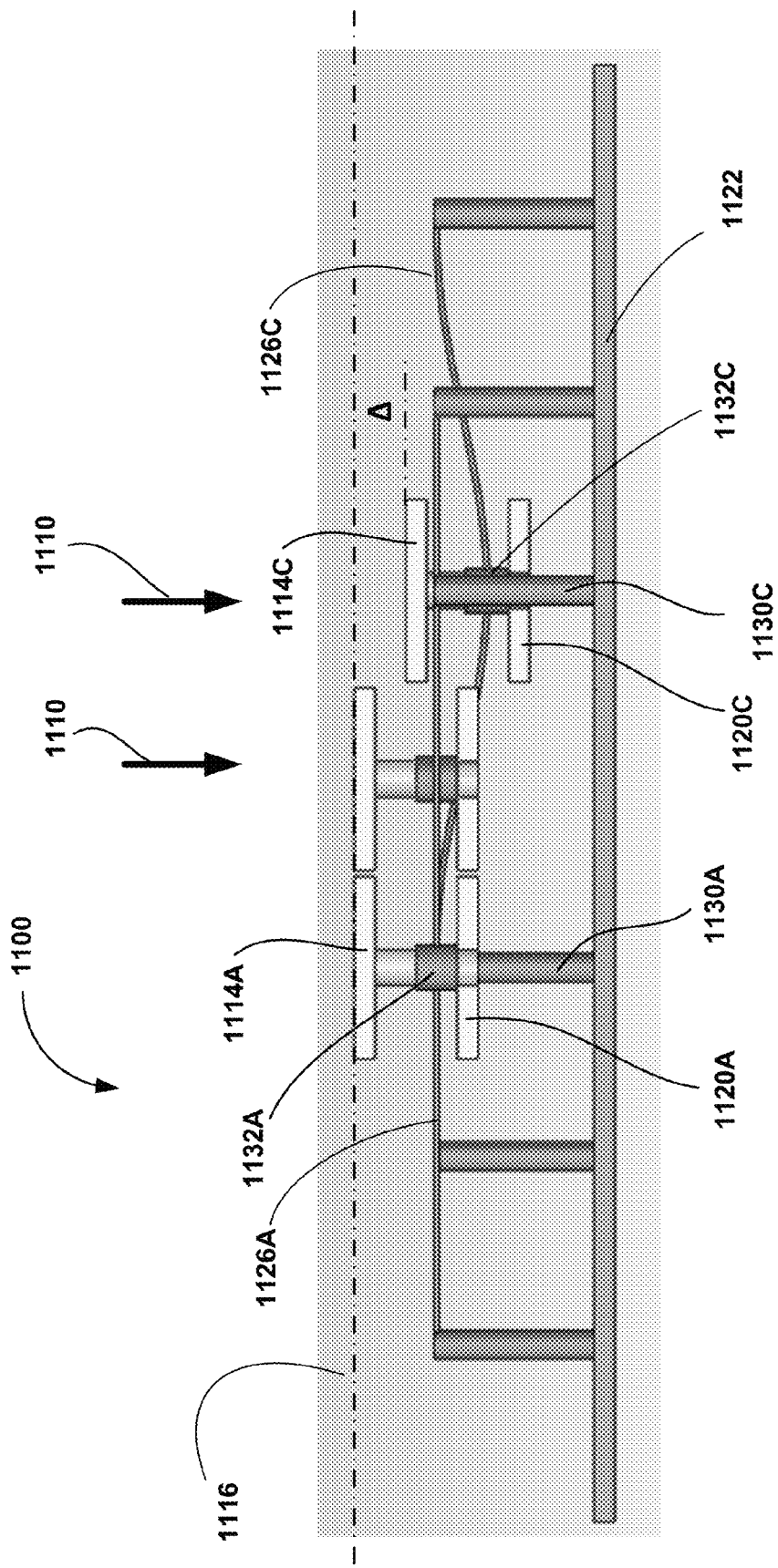

A person of skill in the art will appreciate that the operational characteristics associated with an N×M diffractive optical switch built around an amplitude-modulating DMD embodiment, while possibly quite satisfactory from the exploitation point of view, may desire improvement. For example, the fact that the switch 260 (that employs the DMD of the invention such as DMD 266) of FIG. 2C may have a not-particularly-high a throughput is at least partly due to the modest diffraction efficiency (on the order of 10%) associated with the binary, bi-stable amplitude-modulating angularly-repositionable micro-minors 210A, 210B of the employed DMD. This value is restricted by the physics of diffraction at a binary amplitude-modulating structure. To address at least this problem, a phase-modulating embodiment 1100 of the DMD device of the invention shown in perspective and side views in FIGS. 11A, 11B is structured to modify (as shown—in reflection) the phase distribution of light front 1110 incident thereon by translating individual micro-minors (a few of which are shown as 1114A, 114B, 1114C) in a direction transverse to a device surface 1116. The device surface 1116 of the device is defined as a surface formed by the micro-minors of the phase-modulating embodiment of the invention (generally, a MOEMS) when all such micro-minors are in a neutral, nominal position. The transverse shift of an individual minor with respect to the device surface 1116 defines a phase-shift introduced by such individual mirror into the incident wavefront 1110 upon interact with the wavefront 1110. As shown in FIGS. 11A, 11B, the minors 1114A, 1114B are in a neutral position, while the minor 1114C is actuated by being transversely translated from the device surface 1116 by a distance Δ, generally on the order of a fraction of a wavelength of incident light.

Additional advantages of using the phase-modulating embodiment of the DMD according to the invention—in comparison with the amplitude-modulating version of the DMD device—include the freedom to use, for the purposes of coupling into optical outputs of the switch, light in both +1 and −1 diffraction orders (whether independently or in a cooperated fashion), which operationally allows for spatial expansion of the dimension of the output plane; and an achromatic operation.

As shown, the individual micro-mirror element includes an upper mirrored or simply reflective surface (1114A, 11114B, 11114C) and a lower electrode surface. The transverse translation of an individual micro-mirror can be effectuated, for example, based on the principle of electrostatic attraction and/or repulsion between an individually-addressable electrode with which a given individual micro-mirror is equipped and a based electrode that is common to all the mirrors of the device 1110. The individual electrode 1120C of the micro-minor 1114C and the base electrode 1122 provide but one example of the implementation of such concept. In this example, by applying an appropriate difference of potentials between the electrodes 1120C, 1122 sufficient to create an electrostatic force that overcomes the tensional load provided by mechanical resistance of a spring 1126C juxtaposed with the mirror 1114C, the mirror 1114C is caused to move towards the base electrode 1122.

Depending on particular details of the structural implementation of the embodiment 1100, such movement may be effectuated, for example, in a sliding fashion provided by a sleeve 1132C encircling the fixed support-pole 1130C and, optionally, connected to the spring 1126C such as to increase the potential energy stored in the spring 1126C. In another example (not shown), the pole 1130C may be configured as a component affixed to the micro-minor 1114C and moveable with respect to the electrode 1122, in which case the movement of the micro-mirror 1114C may be coordinated with the corresponding movement of the support-pole 1130C in a piston-like fashion, transversely to the device surface 1116. Other implementations of an individual micro-minor direction-reversible translation in a direction transverse to the surface of the phase-modulating embodiment of the invention can be readily envisioned by a skilled artisan.

In a specific situation where the incident light 1110 has a wavelength of 1550 nm (C-band), a dimension of a given micro-minor 111A, 111B, 1114C may be on the order of 10 microns, and the maximum range transverse displacement Δ may be on the order of 775 nm, which can be discretized by varying the applied voltage.

In operation, a phase-modulating embodiment such as the embodiment 1100 of FIGS. 11A, 11B, imparts variable across the lightfront (light wavefront) 1110 phase-shift, the amount of which at a given micro-mirror (for example, the location of the mirror 114C) can be modulated in an incremental fashion ($\Delta/n$) as a function of a voltage level corresponding to such micro-minor. A person of skill in the art will readily appreciate that the multi-step phase embodiment of the device of the invention can be structured to provide the efficiency of diffraction of light 1110 that approaches 100% as the number of discretely addressable levels n may in practice near 10 to 20. However, even when the available discretization of the movement of each individual transversely-translatable micro-minor includes only four positions (n=4), which respectively corresponds to only four levels of a phase-shift introduced by such mirror into the incident lightfront 1110, the efficiency of diffraction of incident light can be shown to exceed 80% at the image plane containing the M outputs into which such diffracted light is coupled. Accordingly, a phase-modulating embodiment of the invention minimizes throughput losses associated with the diffractive operation of the switch.

It is understood that, while the embodiment 1100 of FIGS. 11A, 11B was shown to include planar micro-minors 1114A, 1114B, 1114B that defined a planar device surface 1116, generally the micro-mirrors of phase-modulating variety of the DMD of the invention can be curved to define a device surface that deviates from a planar surface. It is also understood that, according to an idea of the invention, the transverse translation of an individual mirror can be effectuated not only substantially perpendicularly to the device surface but along a direction and/or line that is inclined with respect to the surface. The transverse translation of an individual mirror is preferably carried out in a tangentially-parallel fashion, when the reflective surface of the individual mirror in question remains tangentially-parallel to itself at any moment during the process of the transverse translation. In the process of the transverse translation, each of the micro-mirrors is moving, along the corresponding line, in piston-like fashion driven by the corresponding repositioning means. While this means was described, in reference to FIGS. 11A, 11B as a resistance-spring-loaded mechanism operable according to the principle of electrostatic attraction, an appropriate modification of the structure of the embodiment 1100 can be arranged as a result of which the embodiment will be operable according to the principle of electrostatic repulsion. Accordingly, in at least one of the first and second positions that an individual micro-mirror O(micro-reflector) may occupy, such micro-minor is tensionally loaded. Further, the individual-minor-repositioning means may conceivably include different mechanisms such as pneumatic, for example. Optionally, an N×M diffractive optical switch based on a phase-modulating embodiment of the device can employ a dispersion compensator unit such as that discussed in reference to FIG. 6. Generally, in order to determine the positions of multiple individual reflectors of the phase-modulating embodiment 1100 corresponding to the holographic pattern as defined, the amplitude information of the result of the Fourier transformation procedure can be discarded, and the phase information and the spatial profile of the holographic pattern can be discretized.

EXAMPLE 6

Embodiment Including Multiple Micro-Mirror Devices in Series

Using a conventional periodic diffraction grating with a period $\Lambda$ as an example, one can appreciate that the angle $\theta_D$ of diffraction of light at such grating is wavelength dependent: $\sin \theta_D = m\Lambda/\lambda$. While the diffractive pattern ($\Lambda$) can be generally corrected to take into account a shift of a particular single wavelength, it does not help the situation when, as it often is necessary in practice, multiple wavelengths are present in the input signal, and the dispersion of the diffraction grating remains an impediment to the operation of a wavelength-multiplexing system.

By analogy with the above, therefore, when even a minute change of operational wavelength within the band of interest (for example, C-band) occurs, the angle of diffraction associated with the diffraction of incident light on the single DMD's holographic pattern in the direction of the N outputs is changing as well, and the location of an imaging spot is misaligned with respect to the position of the corresponding output (such as a facet of the output optical fiber) thereby leading to the reduced throughput. According to an idea of the invention, the use of a switch system including multiple devices of the invention—for example, two symmetrically oriented phase-modulators (such as embodiment 1100 of FIG. 11A) or amplitude-modulators (such as the embodiment 266 of FIG. 2C) disposed in series—to form an image diffraction pattern that is congruent with the spatial distribution of the M outputs in the image plane facilitates the correction of such unwanted wavelength dependence and the formation of an achromatic diffractive optical switch system.

Figure 12A:
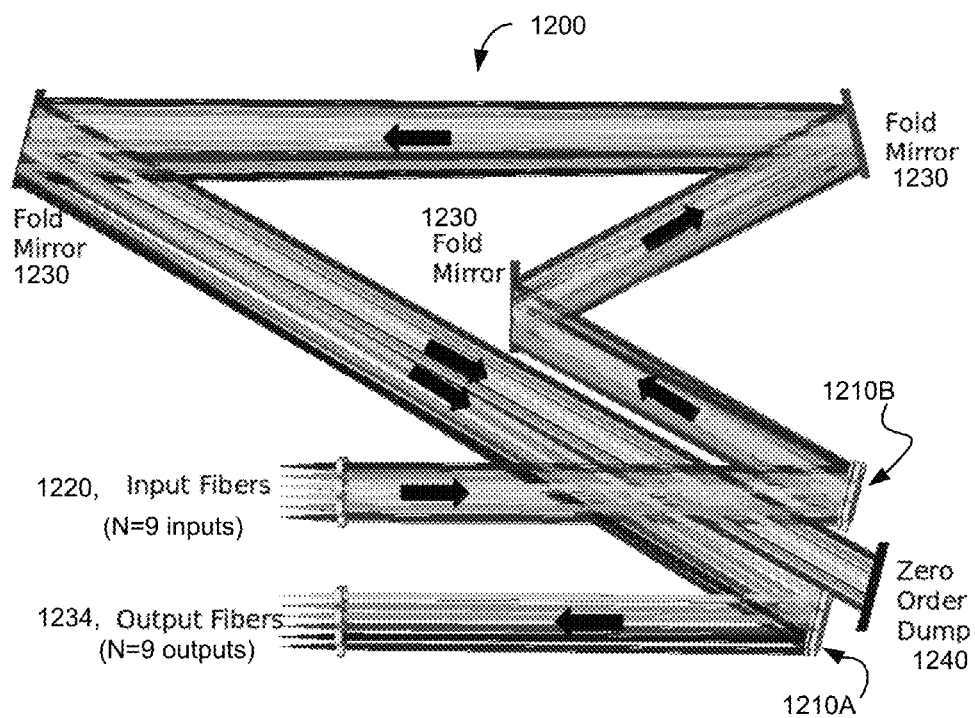
FIGS. 12A, 12B present a diagram illustrating the results of analysis of light ray-tracing through a diffractive optical switch system employing two phase-modulating embodiments of the MOEMS of the invention positioned along an optical path of the lightbeam(s) such as to compensate, in operation, for each other's dispersion.
Figure 12B:
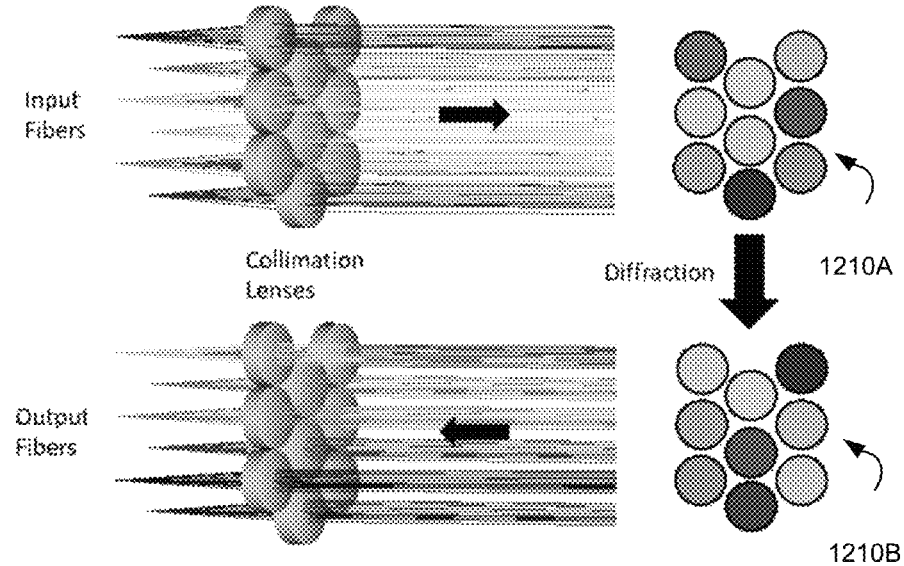

To this end, FIGS. 12A, 12B present an example of a diagram illustrating the results of analysis of light ray-tracing through diffractive optical switch system 1200 employing two phase-modulating embodiments 1210A, 1210B of the MOEMS of the invention (for example, the embodiment 1100) positioned such as to compensate, in operation, for each other's dispersion. In the example of FIG. 12A, each of the N=9 inputs (nine SMFs 1220) delivers light at a different angle towards the phase-modulating MOEMS 1210A of the invention, which diffracts incident light further delivered through a series of folding mirrors 1230 towards the second phase-modulating MOEMS 1210B and further towards the nine light outputs (SMFs) 1234, while redirecting a zero-order diffracted beams at each of the nine wavelengths towards the light/heat-sink 1240. The three folding mirrors 1230 are simple planar mirrors used to reduce the spatial extent and the footprint of the system 1200. The light-sink 1240 is a light-absorbing block used to prevent the scatter of the non-diffracting portion of input light. To ensure and provide for chromatic dispersion compensation of the embodiment, the MOEMS 1210A, 1210B are structured identically and positioned such that each of them diffracts the light incident thereon at the same angle but in the opposite direction. In other words, light is incident of the MOEMS 1210A and 1210B at magnitude-equal and opposite-sign angles such that there is no net angular deviation due to the diffraction of light that has passed both of the MOEMS 1210A, 1210B.

The diffraction of light in the system 1200 works such that the initial light beam deviation imparted by the MOEMS 1210A for each of the N=9 light inputs 1220 is reversed by the following MOEMS 1210B, thereby creating a substantially achromatized diffractive optical switching system based on two sequentially-disposed phase-modulating MOEMS's structured according to an embodiment of the invention. A skilled artisan will readily appreciate that the additional operational advantage provided by such implementation is that is also solves the angular-coupling problem inherent to the design employing a single device-unit. Indeed, in a single-device-based diffractive optical switch, the angle of incidence of light at an output optical fiber changes depending on the position of the fiber with respect to the axis of the wavefront diffracted at the device, when light coupled into the fiber at the periphery of the image plane experiences higher coupling losses. In a diffractive optical switch system that utilized two devices according to the idea of the invention, the angle of incidence of light at the output fibers is preserved regardless of the beam path, thereby optimizing the coupling loss figure. FIG. 12B, by illustrating the results of ray-tracing through the showing of magnification associated with input and output couplers 1220, 1234 and the port switching, provides that the angle of incidence at the output fiber(s) remains invariant.

Figure 13:
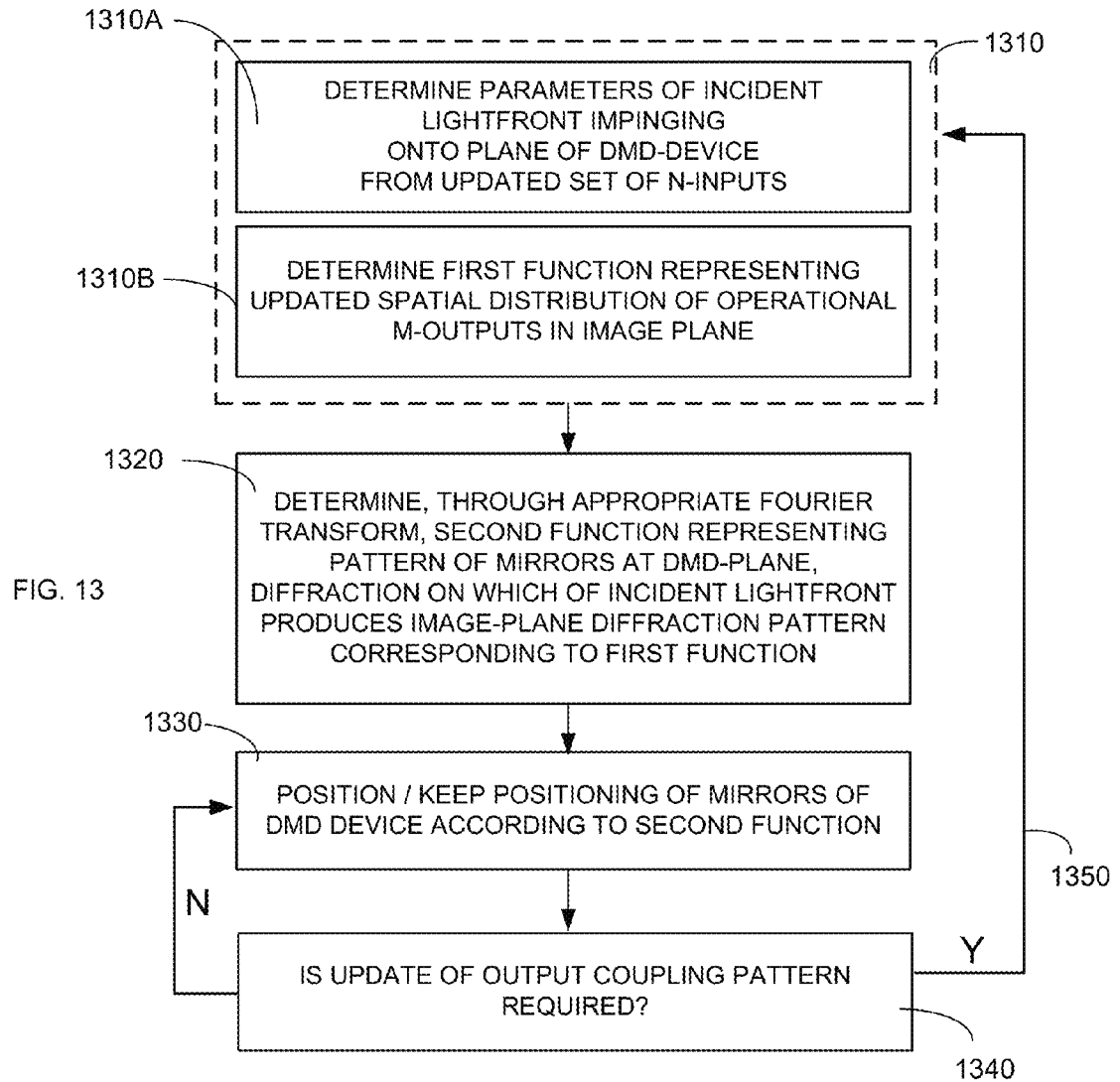
FIG. 13 is a flow-chart showing, schematically, a method of determination of an updatable holographic pattern for an embodiment of the DMD and an example of operation of same.
Figure 14A:
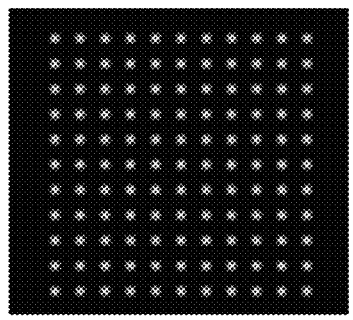
FIGS. 14A, 14B, 14C show several examples of spatial distributions of light-output(s) (in the image/output plane of the diffractive switch employing the phase-modulating embodiment of the invention) and respectively-corresponding holographic patterns according to which the mirrors in the phase-modulating embodiment are positioned to achieve these spatial distributions.
Figure 14A:
Figure 14A:
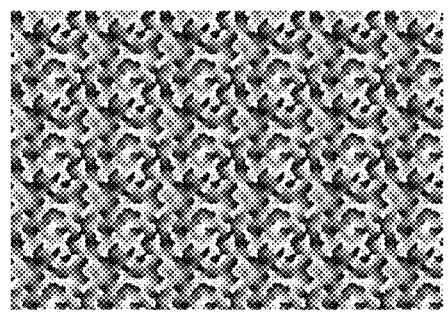
Figure 14B:
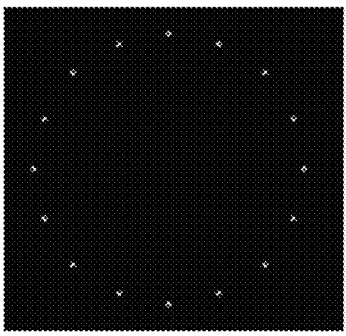
Figure 14B:
Figure 14B:
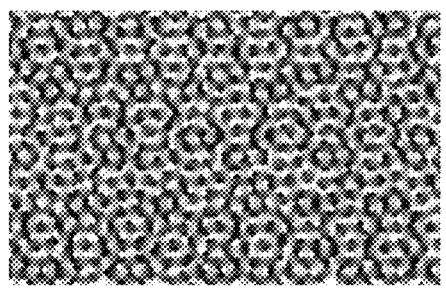
Figure 14C:
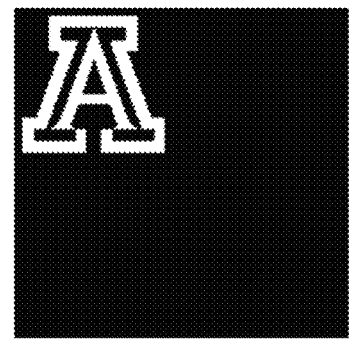
Figure 14C:
Figure 14C:
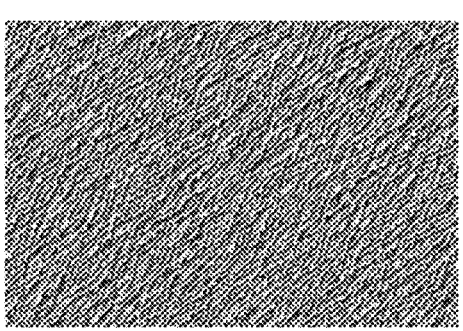

FIG. 13 illustrates schematically a method for optical switching of light between N input and M outputs with the use of an embodiment of the device according to the invention. Here, at step 1310 the wavefronts at the plane of the micro-minor device (such as DMD, MOEMS) and at the image plane are determined. This determination may include the determination, at step 1310A, of the immediate (or updated) distribution of light incident onto the micro-minor device from N-light-inputs that are spatially and/or spectrally organized according to the needs of the network system, and the determination of the spatial positioning of the M-light-outputs in the image plane as dictated by the immediate needs of the networking system, as step 1310B. Following such determination, a holographic pattern to which the mirrors at the micro-minor device -plane must adhere to produce an image diffraction pattern, formed by diffracting the lightfront incident onto the micro-minor device plane and congruent with the spatial positioning of the M-light-outputs, is determined at step 1320. Once the holographic pattern is determined, the multiplicity of the micro-minors of the micro-minor device (whether of the amplitude-modulating variety or a phase modulating variety or a combined/mixed variety) are positioned/oriented according to such pattern (optionally, with the use of electronic circuitry governed by the computer-processing algorithm of the invention) at step 1330,and kept in such spatial orientation until there appears a need for change in or update of any of the opto-geometrical parameters characterizing the switch system. When such update is required, at step 1340, a command is provided, 1350, to the electronic circuitry for recalculation of the holographic patter of step 1320 based on the updated spatial distributions of step(s) 1310 is performed and the operational status of the micro-minor device is accordingly updated.

It is appreciated that the updates of the holographic pattern characterizing the micro-mirror device of the invention (whether an amplitude-modulating version or a phase-modulating version is used) and the resulting switching of the operation of such micro-minor device to reflect an updated distribution of the requested input-output combinations is optimally performed with the use of a data-processing circuitry (such as a computer processor) that is controlled by specifically devised program code including instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to the data-processing circuitry in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Generally, either of N and M can be greater than one. In addition to decreasing the physical extent of the set of the M outputs in the output (image) plane, replacing a standard core single mode fiber with an expanded core single mode fiber will allow to increase the efficiency of coupling of a lightbeam characterized by a beam-waist that is larger than the standard SMF's core. While the use of the proposed technique may, under some operational circumstances, reduce the acceptance angle of the fiber, the adjustments of other parameters of the overall design (such as, for example, the axial location of the image plane) can compensate for the smaller numerical aperture. One example of the alternative configuration involves the insertion of a small mirror array at the current output plane to redirect the diffracted light towards the N-output that have been repositioned to another plane and, in the process of redirection, transmit the light beams for each port towards additional beam shaping components to correct for angular errors, errors in beam-shape and the like. It is also appreciated that, in general, a conventional MEMS-based optical switch can also be structured according to an embodiment of the invention, where the multiplicity of positions of individual micro-mirrors of the 3D MEMS substantially mimic, repeat, correspond to a holographic patters devised as discussed above. The switching time of such 3D MEMS-based switch, however, will be slower (on the order of 50 microseconds).

Disclosed aspects, or portions of these aspects, may be combined in ways not listed above. Accordingly, the invention should not be viewed as being limited to the disclosed embodiment(s).

What is claimed is:

1. A method for simultaneously switching light between N light inputs and M light outputs at a switching rate corresponding to a time duration of about 10 microseconds, the method comprising:
    determining a first function representing a spatial distribution of the M light outputs in an output surface, wherein said M light outputs are spatially-discrete, wherein $M>1$;
    illuminating only a first surface area of a first two-dimensional (2D) array of micro-reflector elements with light from a first light input of the N light inputs, wherein $N>1$,
        wherein the N light inputs are spatially-discrete, wherein said 2D array is located in an intermediate plane between said N light inputs and the output surface;
    illuminating only a second surface area of said first 2D array with light from a second light input of said N light inputs, wherein the first area and the second area are spatially separate from one another and respectively correspond to the first and second light inputs;
    calculating a second function representing a Fourier transform of said first function at the intermediate plane; and
    positioning micro-reflector elements of the first 2D array in a pattern represented by the second function.

2. A method according to claim 1, further comprising diffracting light, incident onto the first 2D array from the N light inputs, towards the M light outputs to form, in the output surface, an image diffraction pattern that is substantially congruent with the spatial distribution of the M light outputs.

3. A method according to claim 1, further comprising modulating intensity distribution of a wavefront of light incident onto the first 2D array from the N light inputs.

4. A method according to claim 1, wherein said positioning includes positioning micro-reflector elements in a pattern devoid of a spatial period that is equal to a size of an individual micro-reflector element.

5. A method according to claim 1, further comprising modifying the spatial distribution of said M light outputs to form an updated distribution of M light outputs, wherein said updated distribution represents spatially disconnected from one another input facets of optical fibers.

6. A method according to claim 1, further comprising
rotating at least one micro-reflector element of the first 2D array from a first angular position defined with respect to a reference plane to a second angular position defined with respect to the reference plane to form an updated first 2D array,
wherein micro-reflector elements of said updated first 2D array are positioned according to an updated second function that represents a Fourier transform of an updated first function,
wherein the updated first function represents an updated distribution of the M light outputs, said updated distribution of the M light outputs formed by spatially disconnected from one another input facets of optical fibers.

7. A method according to claim 1, further comprising
receiving light, redirected by the first 2D array, with a second 2D array at a second angle having a second magnitude and a second sign, such that a net angular deviation of light, caused by diffraction of light that has interacted with both the first and second 2D arrays, is substantially zero as measured at the output surface,
wherein the second 2D array is structurally identical to the first 2D array,
wherein the first and second magnitudes are equal, the first and second signs are opposite.

* * * * *